V. V. PITTMAN.
COOLER.
APPLICATION FILED FEB. 7, 1914.

1,138,505.

Patented May 4, 1915.

Inventor
V. V. Pittman
By Victor J. Evans
Attorney

Witnesses

UNITED STATES PATENT OFFICE.

VINCENT V. PITTMAN, OF SELMA, CALIFORNIA.

COOLER.

1,138,505.

Specification of Letters Patent.

Patented May 4, 1915.

Application filed February 7, 1914. Serial No. 817,286.

*To all whom it may concern:*

Be it known that I, VINCENT V. PITTMAN, a citizen of the United States, residing at Selma, in the county of Fresno and State of California, have invented new and useful Improvements in Coolers, of which the following is a specification.

The invention relates to coolers, and more particularly to the class of portable coolers for refrigerating purposes.

The primary object of the invention is the provision of a cooler wherein the same is entirely made from cement, and includes a compartment for the storage of food products and also a water reservoir whereby the contents of the latter may be utilized for cooling the walls of the cooler.

Another object of the invention is the provision of a cooler wherein the bottom thereof is formed with a trough to catch the drippings from the reservoir, and in this manner ants and other crawling insects will be prevented from entering the cooler when food stuff is placed therein.

A further object of the invention is the provision of a cooler wherein the construction thereof is of a novel form, and which will assure the preserving of food stuff to keep the same fresh and cool.

A still further object of the invention is the provision of a cooler which is simple in construction, strong, and inexpensive in manufacture.

With these and other objects in view, the invention consists in the construction, combination and arrangement of parts as will be hereinafter fully described, illustrated in the accompanying drawing, and pointed out in the claim hereunto appended.

Figure 1:
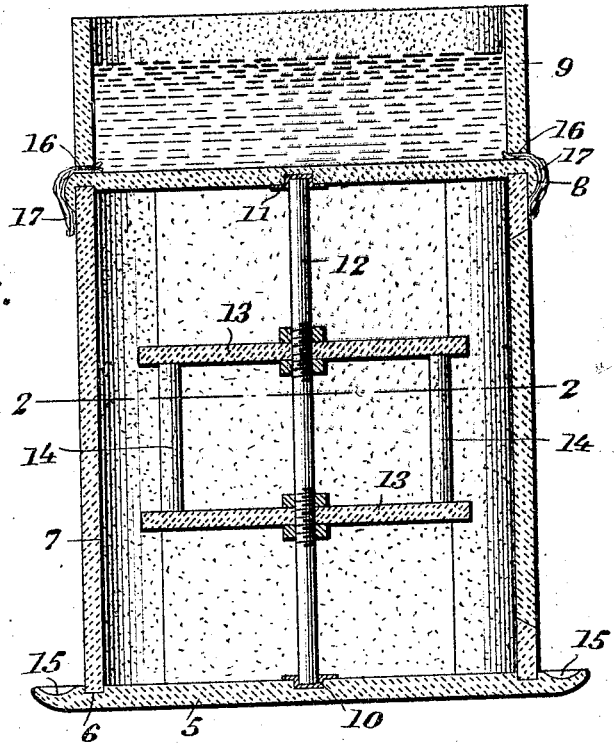
Figure 2:
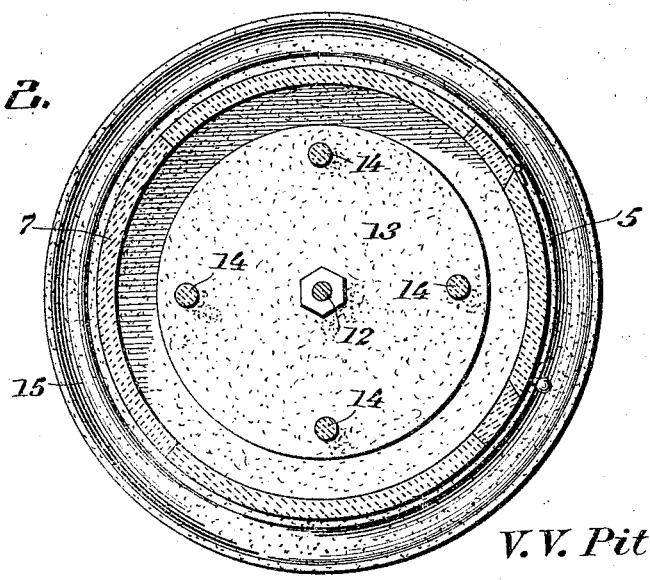

In the drawings:—Figure 1 is a vertical longitudinal sectional view through a cooler constructed in accordance with the invention. Fig. 2 is a sectional view on the line 2—2 of Fig. 1.

Similar reference characters indicate corresponding parts throughout the several views in the drawing.

Referring to the drawing in detail, the cooler comprises a circular-shaped bottom 5, preferably made from cement, and is formed with an annular groove 6 in which is engaged the lower edge of the cylindrical body 7 which is formed in a plurality of sections, the same being made from cement, and in one of the sections may be provided a doorway adapted to be closed by the ordinary swinging door, which is also preferably constructed from cement.

Encircling the upper end of the body 7 is the rim 8 of a water reservoir 9, which is preferably constructed from cement, the rim being formed at the bottom of the said reservoir 9 to engage about the body 7 for holding the sections thereof together when the reservoir is superimposed upon the body. This reservoir is adapted to contain water.

Formed centrally in the bottom 5 is a socket 10, and likewise formed in the bottom of the reservoir 9 in alinement therewith is a further socket 11, and these sockets are adapted to receive the ends of a rod 12 which is rotatable therein and serves as a support for disk-like shelves 13, preferably made from cement, the said shelves being held in spaced relation from each other by means of spacing columns 14. It will be noted that the shelves 13 can be rotated within the body 7 so that food products can be conveniently placed thereon and supported thereby.

Formed in the bottom 5 concentrically with respect to the groove 6 is a channel 15, while formed in the sides of the reservoir 9 at desired intervals are apertures 16 in which are fitted absorbent strips 17 in the form of wicks adapted to hang from the reservoir exteriorly of the body so that the water contained within the reservoir will wet the strips 17 and the drippings therefrom will be caught in the channel 15 for the filling of the same so that ants or other crawling insects will be prevented from gaining entrance to the body 7 of the cooler. The water dripping from the strips 17 will trickle down the outer face of the body 7 and thus sustain the same cool for preserving the contents of the cooler and also rendering such contents cool.

From the foregoing it is thought that the construction and manner of use of the device will be clearly understood, and therefore a more extended explanation has been omitted.

What is claimed is:—

A cooler comprising a bottom having inner and outer channels, a sectional cylindrical body fitted within the innermost channel, a water reservoir superimposed upon the body and having a depending rim embracing the upper end of the said body to hold the sections thereof together, the said reservoir being formed with apertures in its side wall, and absorbent strips passed through the apertures and having the major portion of their length depending without the body.

In testimony whereof I affix my signature in presence of two witnesses.

VINCENT V. PITTMAN.

Witnesses:
W. S. HOPKINS,
F. O. THOMAS.